United States Patent [19]

Kerko et al.

[11] Patent Number: 4,608,349
[45] Date of Patent: Aug. 26, 1986

[54] PHOTOCHROMIC GLASS COMPOSITIONS FOR LIGHTWEIGHT LENSES

[75] Inventors: David J. Kerko; David W. Morgan; David L. Morse, all of Corning, N.Y.

[73] Assignee: Corning Glass Works, Corning, N.Y.

[21] Appl. No.: 797,223

[22] Filed: Nov. 28, 1985

[51] Int. Cl.$^4$ .................. C03C 4/06; C03C 3/118
[52] U.S. Cl. .................................. 501/13; 501/59
[58] Field of Search .................................. 501/13, 59

[56] References Cited

U.S. PATENT DOCUMENTS

| | | | |
|---|---|---|---|
| 3,208,860 | 9/1965 | Armistead et al. | 501/13 |
| 4,018,965 | 4/1977 | Kerko et al. | 501/13 |
| 4,130,437 | 12/1978 | Mazeau et al. | 501/13 |
| 4,168,339 | 9/1979 | Kerko et al. | 501/13 |
| 4,190,451 | 2/1980 | Hares et al. | 501/13 |
| 4,358,542 | 11/1982 | Hares et al. | 501/13 |
| 4,374,931 | 2/1983 | Courbin et al. | 501/13 |
| 4,407,966 | 10/1983 | Kerko et al. | 501/13 |
| 4,550,087 | 10/1985 | Kerko et al. | 501/13 |

*Primary Examiner*—Mark L. Bell
*Attorney, Agent, or Firm*—K. van der Sterre

[57] ABSTRACT

Photochromic glass compositions for thin refractive-index-corrected lens elements consisting essentially of about:

| | |
|---|---|
| $SiO_2$ | 54–58% |
| $B_2O_3$ | 18–22% |
| $Al_2O_3$ | 7–8% |
| $Li_2O$ | 3.75–4.5% |
| $Na_2O$ | 0–1% |
| $K_2O$ | 5.5–7.5% |
| $TiO_2$ | 0–2% |
| $ZrO_2$ | 2–4.5% |
| Ag | 0.20–0.33% |
| Cl | 0.30–0.50% |
| Br | 0.04–0.12% |
| CuO | 0.007–0.012% |
| PbO | 0–0.08% |
| $Sb_2O_3$ | 0–0.20% | having a $Li_2O:Na_2O$ molar ratio of at least 9:1 and exhibiting good darkening, fast fading, good chemical strengthenability and neutral dark-state coloration at thicknesses on the order of 1 mm, are described.

4 Claims, 1 Drawing Figure

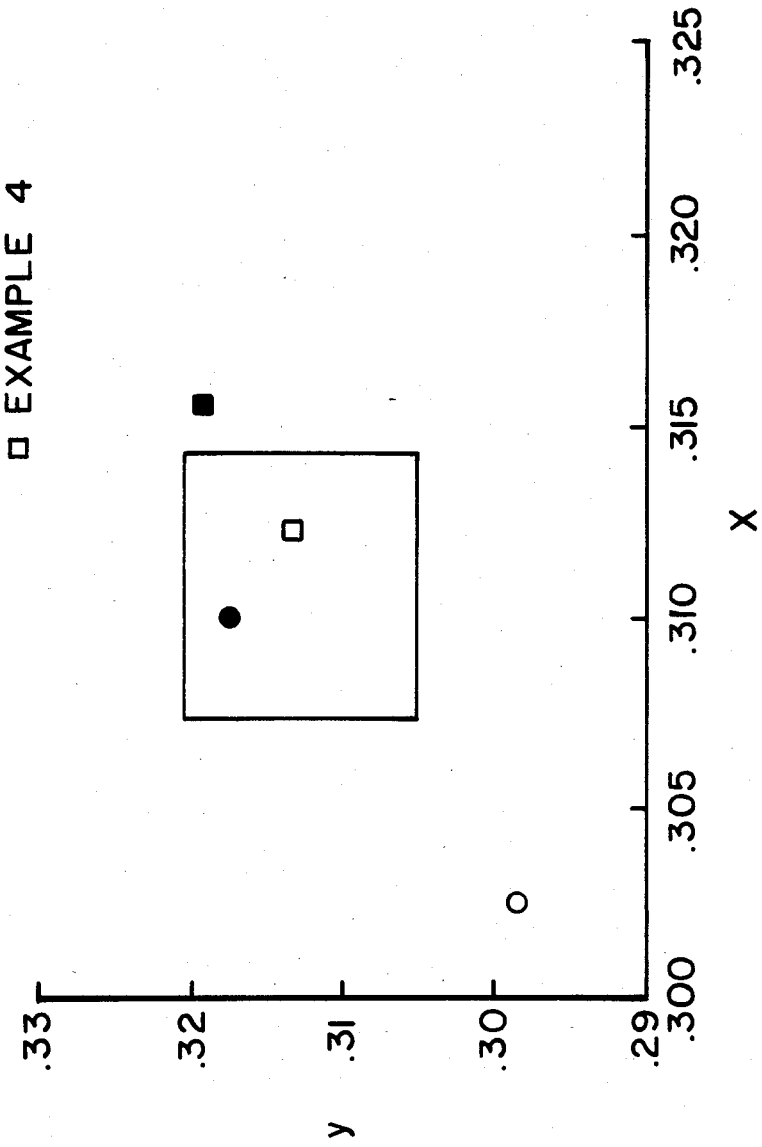

PHOTOCHROMIC GLASS COMPOSITIONS FOR LIGHTWEIGHT LENSES

BACKGROUND OF THE INVENTION

Photochromic or phototropic glasses, as such have been variously termed, had their genesis in U.S. Pat. No. 3,208,860. That patent disclosed glasses demonstrating photochromic behavior, i.e., the glasses darken (change color) when exposed to actinic radiation, commonly ultraviolet radiation, and return to their original state when the radiation is removed. Such glasses are produced by developing crystallites of a silver halide selected from the group of AgCl, AgBr, and AgI therein. The preferred base glasses are stated to reside in the alkali aluminoborosilicate composition system.

Subsequent to that fundamental disclosure, intensive continuous research has been carried out, as is evidenced by the great volume of patent literature, to design glass compositions manifesting ever improved photochromic properties. The most extensive commercial application of photochromic glass has been in the field of spectacle lenses, both as prescription lenses and as non-prescription sunglasses. In view of that situation, research has focussed principally on developing glasses which darken to a low luminous transmittance, which fade very rapidly to their original state, and which retain those darkening and fading characteristics over the range of temperatures commonly encountered by the wearer of spectacle lenses; i.e., between about 0°–100° F. ($\sim -18°$ to $+40°$ C.).

In recent years organic, non-photochromic plastic lenses have made substantial inroads into both the prescription and non-prescription lens markets, principally because of the light weight of such lenses. Thus, the density of the plastic employed in such lenses is considerably less than glass used for the same purpose. Plastic lenses also possess the capability of being readily dyed, imparting a permanent tint thereto with consequent reduction in transmittance, but, as of the present date, no commercially practical photochromic lens has been produced from a plastic.

To gain the perceived advantage of lower weight while enjoying the effect of photochromic behavior, laminated lenses have been produced consisting of an element of photochromic glass and one or more elements of plastic. As can be appreciated, to achieve the desired weight advantage, the glass element will be as thin as possible consistent with the objective of achieving both satisfactory photochromic behavior and essential strength levels in the lens design. The conventional ophthalmic lens has a thickness of about 2 mm; to decrease the weight of the lens it would be desirable to substantially reduce this thickness. Nevertheless, as can be appreciated, as the cross section of a glass article is reduced, the transmittance thereof normally increases. Consequently, to be useful in thicknesses less than 2 mm, the composition of the photochromic glass must be designed to darken to a low luminous transmittance in thin cross sections while retaining the characteristics of fast fading and temperature independence.

U.S. Pat. Nos. 4,018,965 and 4,130,437 disclose the production of non-prescription photochromic sunglasses having thicknesses between about 1.3–1.7 mm. The regimes of glass composition operable in each disclosure are tabulated below in terms of weight percent on the oxide basis.

|  | U.S. Pat. No. 4,018,965 | U.S. Pat. No. 4,130,437 |
|---|---|---|
| $SiO_2$ | 54–66 | 54–66 |
| $Al_2O_3$ | 7–15 | 7–15 |
| $B_2O_3$ | 10–25 | 10–25 |
| $Li_2O$ | 0.5–4 | 0.5–4 |
| $Na_2O$ | 3.5–15 | 3.5–15 |
| $K_2O$ | 0–10 | 0–10 |
| $Li_2O + Na_2O + K_2O$ | 6–16 | 6–16 |
| PbO | 0–3 | 0–1.25 |
| Ag | 0.1–1 | 0.1–0.3 |
| Cl | 0.1–1 | 0.2–1 |
| Br | 0–3 | 0–0.3 |
| CuO | 0.008–0.16 | 0.002–0.02 |
| F | 0–2.5 | 0.2.5 |

The glasses of U.S. Pat. No. 4,018,965 darken at ambient temperatures to a luminous transmittance not exceeding 25%, and exhibit a fading rate such that, after five minutes' fading from the darkened state, the luminous transmittance of the glass is at least 1.5 times that of the darkened transmittance. However, their design does not include compositional constituents needed to obtain refractive index correction to the industry-standard value $n_D = 1.523$.

The glasses of U.S. Pat. No. 4,130,437 darken at ambient temperatures to a luminous transmittance below and demonstrate a fading rate such that, after five minutes' fading at ambient temperature, the glass exhibits a luminous transmittance at least 1.75 times that of the darkened transmittance. Again these glasses are not corrected for refractive index.

U.S. Pat. No. 4,168,339 is drawn to the manufacture of photochromic glass in the form of micro-sheet, i.e., sheet glass having a thickness between about 0.25–0.5 mm, the glass consisting essentially, in weight percent on the oxide basis, of:

| | | | |
|---|---|---|---|
| $SiO_2$ | 54–66 | PbO | 0.4–1.5 |
| $Al_2O_3$ | 7–16 | Br | 0.2–0.5 |
| $B_2O_3$ | 10–30 | Cl | 0.5–1.2 |
| $Na_2O$ | 3–15 | F | 0.2–0.5 |
| $Li_2O$ | 0–4 | CuO | 0.008–0.03 |
| $K_2O$ | 0–10 | Ag | >0.03–1 |

With respect to photochromic behavior, the latter glasses darken at 20° C. to a luminous transmittance below 25%, and display a fading rate at 20° C. such that, after five minutes' fading, the transmittance of the glass increases at least 20 percentage units and, after a one-hour fading period, the glass manifests a luminous transmittance in excess of 80%. These glass are, however, not corrected for refractive index and are not of a composition appropriate for the manufacture of structural glass lens elements of more moderate thickness.

U.S. Pat. No. 4,190,451 discloses photochromic glass compositions which encompass prescription lenses marketed by Corning Glass Works, Corning, N.Y., under the trademark PHOTOGRAY EXTRA ®. The claims encompass glasses consisting essentially, in weight percent on the oxide basis, of:

| | | | |
|---|---|---|---|
| $Li_2O$ | 0–2.5 | $P_2O_5$ | 0–25 |
| $Na_2O$ | 0–9 | $SiO_2$ | 20–65 |
| $K_2O$ | 0–17 | CuO | 0.004–0.02 |
| $Cs_2O$ | 0–6 | Ag | 0.15–0.3 |
| $Li_2O + Na_2O + K_2O + Cs_2O$ | 8–20 | Cl | 0.1–0.25 |
| $B_2O_3$ | 14–23 | Br | 0.1–0.2 |

| | |
|---|---|
| Al$_2$O$_3$ | 5-25 | wherein the molar ratio alkali metal oxide:B$_2$O$_3$ is in the range 0.55-0.85 and the weight ratio Ag:(Cl+Br) is in the range 0.65-0.95.

The patent specifies photochromic properties in terms of 2 mm thickness whereby, at 20° C., the glass darkens to a luminous transmittance below 40% and fades at least 30 percentage units after five minutes' removal from actinic radiation. The patent further notes that a particular advantage exhibited by these glasses is the relative temperature independence of the photochromic properties. PHOTOGRAY EXTRA ® brand lenses have the approximate composition, in weight percent on the oxide basis, of

| | | | |
|---|---|---|---|
| SiO$_2$ | 55.8 | ZrO$_2$ | 4.89 |
| Al$_2$O$_3$ | 6.48 | TiO$_2$ | 2.17 |
| B$_2$O$_3$ | 18.0 | Ag | 0.24 |
| Li$_2$O | 1.88 | CuO | 0.011 |
| Na$_2$O | 4.04 | Cl | 0.20 |
| K$_2$O | 5.76 | Br | 0.13 | wherein Ag, CuO, Cl and Br represent analyzed values.

U.S. Pat. No. 4,358,542 discusses the production of photochromic glasses in sheet form which possess the capability being heat treated to simultaneously induce photochromic behavior therein and sag the glass into molds to form eyeglass blanks of a proper curvature. Those glasses consist essentially, in weight percent on the oxide basis, of:

| | | | |
|---|---|---|---|
| SiO$_2$ | 55-60 | PbO | 0.1-0.25 |
| Al$_2$O$_3$ | 9-10 | Ag | 0.1-0.15 |
| B$_2$O$_3$ | 19-20.5 | Cl | 0.3-0.5 |
| Li$_2$O | 2-2.5 | Br | 0.05-0.15 |
| Na$_2$O | 2-3 | CuO | 0.0065-0.01 |
| K$_2$O | 6-7 | | |

At a thickness of 1.5 mm these glasses demonstrate photochromic properties such that they exhibit a darkened luminous transmittance at 20° C. below 25% and a fading rate such that, after five minutes' fading at 20° C., a luminous transmittance at least twice that of darkened transmittance is attained. However, the compositions are not designed for applications wherein refractive index correction is required, nor where glass thicknesses substantially below 1.5 mm are to be used.

U.S. Pat. No. 4,374,931 reports photochromic glasses which darken to low transmittance values in very thin cross sections and fade very rapidly. Thus, at a thickness of 0.4 mm, the glasses exhibit a darkened luminous transmittance at 25° C. below 45% and a half fading time of five minutes. These glasses consist essentially, in weight percent on the oxide basis, of:

| | | | |
|---|---|---|---|
| SiO$_2$ | 52-59 | TiO$_2$ | 0-3 |
| B$_2$O$_3$ | 18-23 | Ag | 0.17-0.22 |
| Al$_2$O$_3$ | 6-8 | Br | 0.06-0.12 |
| Li$_2$O | 1-2.5 | Cl | 0.29-0.35 |
| Na$_2$O | 1-3 | CuO | 0.012-0.019 |
| K$_2$O | 8-13 | PbO | 0.1-0.15 |
| ZrO$_2$ | 2-6 | | |

While the foregoing compositions have been found to exhibit good photochromic darkening in thin cross-section, the fading characteristics of the glasses are somewhat less rapid than would be desirable. Further they do not exhibit truly neutral coloration in the dark state.

U.S. Pat. No. 4,407,966 claims photochromic glasses manifesting very fast fading capabilities consisting essentially, in weight percent on the oxide basis, of:

| | | | |
|---|---|---|---|
| SiO$_2$ | 56-60 | PbO | 0.1-0.15 |
| Al$_2$O$_3$ | 6-9 | Ag | >0.15-0.25 |
| B$_2$O$_3$ | 18-21 | Cl | 0.2-0.35 |
| Li$_2$O | >2.5-3.5 | Br | 0.075-0.15 |
| Na$_2$O | 0.5-2.5 | CuO | 0.004-0.02 |
| K$_2$O | 5-7 | CeO$_2$ | 0-0.5 |
| ZrO$_2$ | 3.75-5 | | |

At thicknesses of 1.5-2 mm these glasses demonstrate photochromic properties such that they exhibit a darkened luminous transmittance at 25° C. below 25% and a fading rate such that, after five minutes' fading at 25° C., the luminous transmittance increases at least 35 percentage units. These photochromic glasses, however, are not designed for use in applications requiring refractive index correction plus glass thicknesses on the order of 1 mm or less, particularly as regards the need to obtain both a high level of photochromic darkening in thin cross-section and rapid fading. Thus, while the glasses of this patent and of U.S. Pat. No. 4,374,931 above can include constituents such as ZrO$_2$ and TiO$_2$ to raise the refractive index, attempts to develop index-corrected versions thereof retaining the desirable photochromic properties have not been commercially successful.

Notwithstanding the extensive effort to optimize photochromic properties for a wide range of optical and ophthalmic applications as evidenced by the above patent, there remains a need for a glass suited specifically for the manufacture of photochromic glass-plastic laminated lenses of a type wherein the glass element is reduced in weight yet remains a major structural and optical component of the lens system. More specifically, a photochromic glass exhibiting photochromic performance properties, in 1 mm thickness, essentially equivalent to those of the available 2 mm-thick photochromic products is needed. In addition to acceptable photochromic performance, however, the glass must exhibit excellent chemical strengthening characteristics, be capable of refractive index matching to commercial ophthalmic standards ($n_D$=1.523), and exhibit acceptable melting and forming properties.

It is therefore a principal object of the present invention to provide novel compositions for photochromic glasses demonstrating the characteristics necessary for thin ophthalmic lenses.

It is a further object to provide a thin photochromic glass lens element suitable for use in the manufacture of prescription glass-plastic laminated lens products and/or lightweight all-glass lens constructions.

Other objects and advantages of the invention will become apparent from the following description thereof.

SUMMARY OF THE INVENTION

The present invention is based on the discovery of a narrowly-defined region of glass composition which yields index-corrected, fast-fading photochromic glasses with physical properties and darkening characteristics rendering them especially suited for the manufacture of pressed ophthalmic ware, particularly thin glass lens elements exhibiting superior photochromic performance.

Glass compositions provided in accordance with the present invention are generally of alkali aluminoborosilicate composition. However they contain higher concentrations of $Li_2O$ and lower quantities of $Na_2O$ and $PbO$ than have been demanded in prior art fast-fading index-corrected photochromic glasses, adjustments we have found to be critical to meet the more stringent requirements of good photochromic darkening and fast fading in a thin refractive-index-corrected lenses.

Glass compositions suitable for use in accordance with the invention consist essentially, in weight percent, of about:

| | |
|---|---|
| $SiO_2$ | 54–58% |
| $B_2O_3$ | 18–22% |
| $Al_2O_3$ | 7–8% |
| $Li_2O$ | 3.75–4.5% |
| $Na_2O$ | 0–1% |
| $K_2O$ | 5.5–7.5% |
| $TiO_2$ | 0–2% |
| $ZrO_2$ | 2–4.5% |
| Ag | 0.20–0.33% |
| Cl | 0.30–0.50% |
| Br | 0.04–0.12% |
| CuO | 0.007–0.012% |
| PbO | 0–0.08% |
| $Sb_2O_3$ | 0–0.20% |

In addition, the compositions must satisfy the further requirement that the mole ratio of $Li_2O:Na_2O$ in the glass must equal or exceed 9:1, in order to meet the simultaneous requirements of adequate darkening and fast fading.

We have found that, within the above composition limitations, glasses can be obtained which closely approximate the darkening and fading of prior art fast-fading index-corrected photochromic glasses even when limited to thickness values not exceeding about 1 mm. Hence, in a standard thickness of 1 mm, glasses formed from compositions within the above-described composition region exhibit, when free from added tint:

(a) a clear luminous transmittance of approximately 88–92%; and (b) a darkened transmittance at 25° C. not exceeding about 35% combined with a fading rate at that temperature yielding an increase in luminous transmittance of at least 35 percentage points in 5 minutes of fading.

Further, the glasses of the invention are capable of being chemically strengthened to modulus of rupture strengths in excess of 40,000 psi with a depth of compression layer of at least 0.003 inches, and of being adjusted in refractive index to an index value $n_D = 1.523$. And finally the glasses of the invention exhibit a more neutral color in the darkened state than prior art glasses designed for fast fading and/or high darkening in thin cross-section.

DESCRIPTION OF THE DRAWING

The drawing consists of a chromaticity diagram comparing the darkened color of some high-darkening prior art glasses with that of a glass provided in accordance with the invention.

DETAILED DESCRIPTION

The invention may be further illustrated by specific examples of glass compositions within the scope thereof which are reported below in Table I. The compositions reported, which also include two prior art glasses (Examples 5 and 6), are shown in parts by weight. Since the totals for each composition approximate 100, the proportions shown correspond approximately to weight percent values.

Amounts of the major constituents in Table I are reported on the oxide basis, while the photochromic constituents, being present in only minor proportions, are reported on an elemental basis as determined by x-ray fluorescence analysis of glass samples. Also reported for each sample is the mole ratio R, which is the mole ratio of the $Li_2O$ content of each sample to the $Na_2O$ content thereof, and the refractive index ($n_D$) for the index-corrected glasses.

Glasses such as shown in the Table are conveniently prepared by compounding batches which are then ball-milled to assure melt homogeneity. The batches are then melted in a small continuous melting unit at approximately 1400°–145° C. Glass lens blanks are then formed from the melts by pressing, and the blanks are promptly annealed at 450° C. prior to further processing.

TABLE I

| | 1 | 2 | 3 | 4 | 5 | 6 |
|---|---|---|---|---|---|---|
| $SiO_2$ | 55.7 | 55.2 | 55.0 | 55.2 | 58.9 | 55.8 |
| $B_2O_3$ | 20.1 | 20.6 | 20.5 | 20.6 | 20.0 | 18.0 |
| $Al_2O_3$ | 8.0 | 7.3 | 7.3 | 7.4 | 7.17 | 6.48 |
| $Li_2O$ | 4.3 | 4.3 | 4.3 | 4.3 | 3.12 | 1.88 |
| $Na_2O$ | 0.8 | 0.8 | 0.8 | 0.8 | 0.78 | 4.04 |
| $K_2O$ | 6.1 | 6.1 | 6.0 | 6.1 | 5.89 | 5.76 |
| $ZrO_2$ | 2.7 | 4.2 | 4.7 | 4.0 | 3.86 | 4.89 |
| $TiO_2$ | 1.7 | 1.2 | 1.0 | 1.4 | — | 2.17 |
| PbO | — | — | — | 0.03 | 0.12 | — |
| Ag | 0.20 | 0.24 | 0.24 | 0.25 | 0.20 | 0.24 |
| Cl | 0.34 | 0.34 | 0.36 | 0.34 | 0.30 | 0.20 |
| Br | 0.10 | 0.10 | 0.11 | 0.095 | 0.15 | 0.13 |
| CuO | 0.008 | 0.008 | 0.008 | 0.009 | 0.008 | 0.011 |
| $Sb_2O_3$ | 0.13 | 0.16 | 0.13 | 0.03 | — | — |
| R ratio | 11.15 | 11.15 | 11.15 | 11.15 | 8.3 | 0.97 |
| $n_D$ | 1.523 | 1.523 | 1.523 | 1.523 | — | 1.523 |

Examples 1–4 in Table I represent glasses within the scope of the present invention, whereas Examples 5 and 6 are prior art glasses. Example 5 is a preferred composition described in U.S. Pat. No. 4,407,966 (as Example 3), while Example 6 is a composition corresponding to that of the commercially available PHOTOGRAY EXTRA ® brand lenses.

While the glasses reported in Table I are essentially free of added colorants, such that the clear luminous transmittances thereof approximate 90%, it will be recognized that conventional colorants may be added to reduce the clear luminous transmittances thereof to lower levels at selected values, e.g., in the range of 45–90% if desired. Known tinting agents such as the transition metal colorants CoO, $Cr_2O_3$, $Fe_2O_3$, $MnO_2$, NiO and $V_2O_5$, or rare earth colorants such as $CeO_2$, $Er_2O_3$ and $Nd_2O_3$, can be used for this purpose as needed.

As with known photochromic glass compositions, minor additions of other conventional glass-forming and/or glass modifying oxides can be made to the compositions herein described, provided the added constituents do not adversely affect the essential properties of the resulting glasses. For example, alkaline earth additions such as MgO (up to about 3% by weight) and additions of glass formers such as $P_2O_5$ (up to about 10% by weight) may be made, with the usual compensating adjustments of other constituents in the known manner.

Refractive index correction in these glasses is achieved through the combined effect of the high $Li_2O$ level and the introduction of $ZrO_2$ and, optionally, $TiO_2$. The additive $Sb_2O_3$ is included primarily as a fining agent, but also affects the oxidation state of constituents such as CuO, and should therefore be included only in the proportions described.

As noted in U.S. Pat. No. 4,407,966, PbO has in the past been considered to be an essential constituent in high-alkali boroaluminosilicate-based photochromic glasses in order to achieve darkening levels below 50%. The glasses of the present invention, however, may contain little or no added PbO, yet will still exhibit good darkening, even in 1 mm cross-section, despite the high $Li_2O$ proportions prescribed. Thus the present glasses achieve a level of darkening at 1 mm thickness essentially equivalent to that of PHOTOGRAY EXTRA ™ lenses at 2 mm thickness.

The development of photochromic properties in glass lens blanks produced from the compositions such as described above in Table I requires exposing the glasses to a heat treatment to develop silver halide crystallites therein. Preferred temperatures for such heat treatments are in the range of about 550°–660° C., with treatment times typically ranging about 10–30 minutes at these temperatures. Higher or lower temperatures can be used, but shorter or longer treating times will then normally be required.

Table II below reports photochromic properties typically resulting from the heat treatment of glass samples for selected compositions reported in Table I above. Included in Table II for each sample from Table I are the thickness of each sample and the heat treatment used to develop photochromic properties therein, reported in minutes (m) at temperature (°C.). Also reported are $T_o$, the initial or undarkened transmittance of the sample, $T_{D15}$, the darkened transmittance of the sample after exposure to a simulated solar source of ultraviolet light, and $P_{F5}$, the number of percentage points of transmittance increase exhibited by the sample during a 5-minute fading interval in the absence of ultraviolet light. The ultraviolet light source utilized to test the glass samples was a solar simulator apparatus such as described in U.S. Pat. No. 4,125,775; the measurement procedures employed were substantially as described in U.S. Pat. No. 4,407,966, with all measurements being taken at 20° C. or 25° C. as indicated by the exposure temperature.

TABLE II

| Example No. | Thick. (mm) | Heat Treatment | Solar Simulator Data Exposure Temp (°C.) | $T_o$ | $T_{D15}$ | $P_{F5}$ |
|---|---|---|---|---|---|---|
| 1 | 1.3 mm | 30 m. @ 640° | 20° C. | 89.1 | 29.7 | 39.4 |
| 1 | 1.3 mm | 30 m. @ 640° | 25° C. | 88.9 | 34.0 | 42.1 |
| 2 | 1.3 mm | 30 m. @ 625° | 20° C. | 89.7 | 25.8 | 42.8 |
| 2 | 1.3 mm | 30 m. @ 625° | 25° C. | 89.6 | 30.9 | 45.3 |
| 4 | 1.0 mm | 30 m. @ 630° | 20° C. | 90.4 | 21.5 | 23.4 |
| 4 | 1.0 mm | 30 m. @ 630° | 25° C. | 90.3 | 22.7 | 35.1 |
| 5 | 2.0 mm | 30 m. @ 660° C. | 25° C. | 90.0 | 22.8 | 49.9 |
| 6 | 2.0 mm | 30 m. @ 660° C. | 25° C. | 90.0 | 26.5 | 37.5 |

It is of particular interest to compare the photochromic performance data in Table II for the testing of a standard PHOTOGRAY EXTRA ® lens at 2 millimeter thickness (Example 6) with the performance of a preferred composition according to the present invention, reported as Example 4. As can be seen from an examination of these data, glasses provided in accordance with the invention are capable of providing photochromic performance in 1 mm thickness at 25° C. nearly equivalent to that of the prior art commercial product at 2 mm thickness. This makes the inventive glasses particularly well suited for the production of thin photochromic lens elements for laminates or other applications wherein index-corrected high performance glasses are required. And while the prior art glass of Example 5 exhibits excellent fading, its' darkening at 2.0 mm thickness does not greatly exceed that of the inventive glasses at 1–1.3mm thickness, and the former is not an index-corrected glass composition.

Outdoor photochromic test data further confirm the favorable comparison between the present glasses and commercially available index-corrected glasses such as PHOTOGRAY EXTRA ® glass. Table III below reports outdoor test data for the latter glass in both 1 mm and 2 mm thickness, and for 1 mm samples of the inventive glass of Example 2 of Table I, for 60-minute darkening at two different temperatures. As is evident from the data, in the outdoor environment the Example 2 glass was found to exhibit superior properties under all of the conditions evaluated.

TABLE III

| Example No. | Thick. (mm) | Outdoor Data Exposure Temp(°C.) | $T_o$ | $T_{D60}$ | $P_{F5}$ |
|---|---|---|---|---|---|
| 2 | 1.0 mm | 24° | 86.1 | 18.9 | 44.0 |
| 6 | 1.0 | 24° | 87.8 | 44.7 | 35.9 |
| 6 | 2.0 | 24.6° | 85.6 | 24.6 | 27.9 |
| 2 | 1.0 | 38.5° | 87.0 | 35.8 | 36.8 |
| 6 | 1.0 | 40.5° | 88.1 | 52.8 | 25.0 |
| 6 | 2.0 | 38° | 85.7 | 37.0 | 34.2 |

A further feature of the glasses of the invention which advantageously distinguishes them from many of the fast-fading photochromic glasses of the prior art is an extremely neutral color in the darkened state, and as well as at intermediate transmittances exhibited during fading from the darkened to the clear state. By neutral coloration is meant a gray color closely approximating the color of the standard light source Illuminant C, as defined in terms of the 1931 C.I.E. trichromatic colorimetric system. This system, fully described by A. C. Hardy in the *Handbook of Colorimetry*, Technology Press, M.I.T., Cambridge, Mass. (1936), provides an objective and accurate basis for comparing the true colors of glass samples at various levels of transmittance.

The Drawing consists of an x-y chromaticity diagram based on the aforementioned C.I.E. colorimetric system wherein coloration in a sample material is reflected by its x and y color coordinates. Neutral coloration would require that those coordinates lie as closely as possible to the point marked Illuminant C on the diagram. The color coordinates of Illuminant C are approximately x=0.3101 and y=3162.

A typical darkened state coloration (after 5 minutes of exposure to simulated solar radiation as hereinabove described) for a photochromic glass provided in accordance with the invention, as exemplified by Example 4 of Table I, is determined to lie closely adjacent to the coordinates of Illuminant C, i.e., at coordinates x=0.3121 and y=0.3127 as shown in the diagram. In contrast a typical PHOTOGRAY EXTRA lens (PG EXTRA) has a slightly yellower dark state color, falling at color coordinates x=0.3150 and y=0.3223 on the diagram, while an alternative prior art high-darkening glass (HD GLASS) designed for thin lens elements has a slightly more purple color at color coordinates x=0.3025 and y=0.2984 on the diagram. The latter glass is a glass according to U.S. Pat. No. 4,374,931, having a weight composition of about 55.7% $SiO_2$, 17.4% $B_2O_3$, 6.1% $Al_2O_3$, 2.1% $Li_2O$, 1.49% $Na_2O$, 9.45% $K_2O$, 4.95% $ZrO_2$, 2.4% $TiO_2$, 0.11% PbO, 0.21% Ag, 6.34% Cl, 0.10% Br, 0.009% CuO, and 0.12% $Sb_2O_3$.

Untinted glasses provided in accordance with the invention will have darkened colors such that x ranges from about 0.3070–0.3140 and y from about 0.3050–0.3200, as illustrated by the bounded region of the Drawing. Most preferably the glasses of the invention are characterized by dark state colors, when free of added tint, within the ranges of x=0.3120±0.0020 and y=0.3130±0.0030. These ranges correspond to a highly neutral gray coloration in the darkened glass.

A further particularly advantageous characteristic of the glasses of the invention is excellent chemical strengthenability. This characteristic takes on particular significance for applications such as laminates wherein exceptional resistance to impact breakage must be exhibited by a relatively thin glass element. Glasses of the invention are capable of being strengthened to modulus of rupture values in excess of 40,000 psi with compression layers in excess of 3.2 mils being provided. Thus glass samples having the composition of Example 3 from Table I, when immersed for 16 hours in a molten salt bath consisting of 60%(wt) $KNO_3$ and 40%(wt) $NaNO_3$ at 400° C., exhibited a mean modulus of rupture strength 43,300 psi with a mean depth-of-compression layer of 3.2 mils. These desirable strengthening characteristics are of substantial value in the design of composite lenses employing light-weight glass elements.

Finally, as hereinabove noted, the compositions of the invention are refractive-index-correctible to standard index values such as $n_D$=1.523. Moreover, as evidenced by the data in Tables I–III, refractive index correction is readily achieved without loss of the photochromic properties required for use of the glasses in thin-glass lens designs.

We claim:

1. A composition for a photochromic glass consisting essentially, in weight percent on the oxide basis of about:

| | |
|---|---|
| $SiO_2$ | 54–58% |
| $B_2O_3$ | 18–22% |
| $Al_2O_3$ | 7–8% |
| $Li_2O$ | 3.75–4.5% |
| $Na_2O$ | 0–1% |
| $K_2O$ | 5.5–7.5% |
| $TiO_2$ | 0–2% |
| $ZrO_2$ | 2–4.5% |
| Ag | 0.20–0.33% |
| Cl | 0.30–0.50% |
| Br | 0.04–0.12% |
| CuO | 0.007–0.012% |
| PbO | 0–0.08% |
| $Sb_2O_3$ | 0–0.20% | wherein the mole ratio $Li_2O:Na_2O$ equals or exceeds 9:1.

2. A photochromic glass having a composition according to claim 1 and exhibiting, when free of added tint at a thickness of about 1 mm, a clear luminous transmittance of approximately 88–92%, a fully darkened transmittance at 25° C. not exceeding about 35%, a fading rate at 25° C. from fully darkened state providing at least 35 percentage points of fading in 5 minutes, and a coloration in the fully darkened state corresponding to chromaticity coordinates in the range of: x=0.3070–0.3140 and y=0.3050–0.3200 in the 1931 C.I.E. trichromatic colorimetric system.

3. A photochromic lens element formed of a glass according to claim 2 having a thickness not exceeding about 1 mm, a refractive index $n_D$=1.523, a chemically strengthened modulus of rupture strength of at least about 40,000 psi, and a surface compression layer after chemical strengthening of at least 0.003 inches thickness.

4. A photochromic lens element in accordance with claim 3 which has the following analyzed composition:

| | |
|---|---|
| $SiO_2$ | 55.2 |
| $B_2O_3$ | 20.6 |
| $Al_2O_3$ | 7.4 |
| $Li_2O$ | 4.3 |
| $Na_2O$ | 0.80 |
| $K_2O$ | 6.1 |
| $ZrO_2$ | 4.0 |
| $TiO_2$ | 1.4 |
| PbO | 0.03 |
| Ag | 0.25 |
| Cl | 0.34 |
| Br | 0.095 |
| CuO | 0.009 |
| $Sb_2O_3$ | 0.03 |

* * * * *

UNITED STATES PATENT AND TRADEMARK OFFICE
CERTIFICATE OF CORRECTION

PATENT NO. : 4,608,349

DATED : 8/26/86

INVENTOR(S) : Kerko-Morgan-Morse

It is certified that error appears in the above-identified patent and that said Letters Patent is hereby corrected as shown below:

Title Sheet, first column, (item [22]), change "Filed: Nov. 28, 1985" to -- Filed: Nov. 12, 1985.

Column 2, Table 3, at the bottom of the first column of the table, insert -- $Al_2O_3$ - 5-25 --.

Column 6, line 20, delete "1400°-145°" and insert -- 1400° - 1450° --; line 58, after "$Er_2O_3$" insert -- $Ho_2O_3$ --.

Column 8, line 60, change "Y = 3162" to -- Y = .3162 --.

Signed and Sealed this

Twenty-seventh Day of January, 1987

Attest:

DONALD J. QUIGG

Attesting Officer

Commissioner of Patents and Trademarks